United States Patent
Shiba (10) Patent No.: US 9,308,877 B2
(45) Date of Patent: Apr. 12, 2016

(54) POWER CONTROL UNIT

(75) Inventor: Kenjiro Shiba, Takahama (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 244 days.

(21) Appl. No.: 14/008,061

(22) PCT Filed: Mar. 31, 2011

(86) PCT No.: PCT/JP2011/058213
§ 371 (c)(1),
(2), (4) Date: Sep. 27, 2013

(87) PCT Pub. No.: WO2012/131976
PCT Pub. Date: Oct. 4, 2012

(65) Prior Publication Data
US 2014/0015313 A1    Jan. 16, 2014

(51) Int. Cl.
| | |
|---|---|
| *B60R 16/023* | (2006.01) |
| *B60L 11/12* | (2006.01) |
| *B60L 11/14* | (2006.01) |
| *B60L 7/14* | (2006.01) |
| *B60L 15/20* | (2006.01) |
| *H02M 7/00* | (2006.01) |

(52) U.S. Cl.
CPC ............... *B60R 16/0231* (2013.01); *B60L 7/14* (2013.01); *B60L 11/123* (2013.01); *B60L 11/14* (2013.01); *B60L 15/2009* (2013.01); *B60L 2210/10* (2013.01); *B60L 2210/40* (2013.01); *B60L 2240/421* (2013.01); *B60L 2240/423* (2013.01); *B60L 2270/20* (2013.01); *H02M 7/003* (2013.01); *Y02T 10/6217* (2013.01); *Y02T 10/642* (2013.01); *Y02T 10/7077* (2013.01); *Y02T 10/7216* (2013.01); *Y02T 10/7241* (2013.01); *Y02T 10/7275* (2013.01)

(58) Field of Classification Search
CPC .... B60R 16/0231; B60R 16/00; B60R 16/02; B60R 16/03; B60L 11/00
USPC .................................. 361/627; 307/9.1, 10.1
See application file for complete search history.

(56) References Cited

U.S. PATENT DOCUMENTS

2011/0275251 A1* 11/2011 Aoki et al. ..................... 439/709
2012/0238134 A1* 9/2012 Matsuoka et al. ............. 439/587

FOREIGN PATENT DOCUMENTS

| | | |
|---|---|---|
| JP | 08-66050 A | 3/1996 |
| JP | 08298711 A | 11/1996 |

(Continued)

OTHER PUBLICATIONS

Structure of Integrated Terminal Block of Inverter Adopted in Toyota's "Prius C" and "Yaris HV", Dec. 2011.

*Primary Examiner* — Hoa C Nguyen
*Assistant Examiner* — Keith Depew
(74) *Attorney, Agent, or Firm* — Kenyon & Kenyon LLP (57) ABSTRACT

A power control unit is mounted on a hybrid vehicle, and controls the electric power used for driving the vehicle. The power control unit includes a PCU case having a top cover where an opening is formed, a terminal block placed in the PCU case, and arranged opposite to the opening, and a substrate placed in the PCU case, and on which an electronic component is mounted. The terminal block includes a wall. The wall is arranged between the substrate and opening, and extends towards the top cover at a circumference of the aperture of the opening. By such a configuration, there is provided a power control unit having an intrusion of a foreign object suppressed while accomplishing reduction in size and cost.

7 Claims, 10 Drawing Sheets

(56) References Cited

FOREIGN PATENT DOCUMENTS

| JP | 11121690 A | 4/1999 |
| JP | 2006298272 A | 11/2001 |
| JP | 2003303939 A | 10/2003 |
| JP | 200799012 A | 4/2007 |
| JP | 200861401 A | 3/2008 |
| JP | 201160670 A | 3/2011 |

* cited by examiner

POWER CONTROL UNIT

CROSS REFERENCE TO RELATED APPLICATION

This is a national phase application based on the PCT International Patent Application No. PCT/JP2011/058213 filed on Mar. 31, 2011, the entire contents of which are incorporated herein by reference.

TECHNICAL FIELD

The present invention generally relates to power control units, more particularly a power control unit mounted on a vehicle such as a hybrid vehicle or electric vehicle for controlling the electric power used for driving the vehicle.

BACKGROUND ART

With regard to a conventional power control unit, Japanese Patent Laying-Open No. 8-66050 (PTD 1), for example, discloses an inverter device that readily allows exchange of a capacitor, and that can have the number of processing steps in the assembly of the inverter device reduced, aiming to sufficiently reduce the cost. In the inverter device disclosed in PTD 1, a control circuit terminal cover having a structure allowing opening and closing to be fixed is provided corresponding to the terminal block of a control substrate. The control circuit terminal cover is attached to an operation panel cover fixed to the control substrate.

Japanese Patent Laying-Open No. 2003-303939 (PTD 2) discloses a power semiconductor device and inverter device directed to allowing down-sizing even in the case where the AC voltage to be received is great. In the power semiconductor device disclosed in PTD 2, there are provided, between an AC terminal and a P terminal adjacent to each other, an insulation protruding wall higher than the upper end of the terminals, and a recess that is concave than the lower end of the terminal.

Japanese Patent Laying-Open No. 8-298711 (PTD 3) discloses an electrical apparatus attachment configuration directed to improving the quality by eliminating interference between a bolt and wire harness, as well as prevent damage and/or biting into the wire hardness. At the bolt fastener of the electrical connection box disclosed in PTD 3, a circumferential wall is disposed at the outer side of the bolt. The circumferential wall has a bending wall corresponding to the leading end of the circumferential wall located below the bolt and being bent upward when the bolt is inserted.

Japanese Patent Laying-Open No. 2008-61401 (PTD 4) discloses a waterproof cover configuration for an electrical connection box directed to promptly discharging any droplets of water from above to reliably prevent entry of water into the electrical connection box. Further, Japanese Patent Laying-Open No. 2006-298272 (PTD 5) discloses a torque transmission device directed to preventing entry of a foreign object such as minute metal and the like mixed in a lubricant from entering the motor generator. Further, Japanese Patent Laying-Open No. 2007-99012 (PTD 6) discloses an electric type torque converter directed to preventing reduction in the motor generator performance while reducing the dimension in the axial direction.

CITATION LIST

Patent Document

PTD 1: Japanese Patent Laying-Open No. 8-66050
PTD 2: Japanese Patent Laying-Open No. 2003-303939
PTD 3 Japanese Patent Laying-Open No. 8-298711
PTD 4: Japanese Patent Laying-Open No. 2008-61401
PTD 5: Japanese Patent Laying-Open No. 2006-298272
PTD 6: Japanese Patent Laying-Open No. 2007-99012

SUMMARY OF INVENTION

Technical Problem

The inverter device disclosed in PTD 1 set forth above has an intrusion of dust and the like into the terminal block prevented by closing the control circuit terminal cover when the terminal block is not in use. When such a cover member is provided for the purpose of preventing an intrusion of foreign objects, the number of components will be increased to raise the fabrication cost, and/or the space to attach the cover and fastening means for the cover will be required, leading to the possibility of increasing the size of the device.

In view of the foregoing, an object of the present invention is to provide a power control unit having an intrusion of a foreign object suppressed while reducing the size and cost.

Solution to Problem

A power control unit according to the present invention is mounted on a vehicle, and functions to control the electric power used for driving the vehicle. The power control unit includes a casing having a top where an opening is formed, a terminal block placed in the casing, arranged opposite to the opening, and a substrate placed in the casing, and on which an electronic component is mounted. The terminal block includes a first wall. The first wall is arranged between the substrate and the opening, extending towards the top at a circumference of an aperture of the opening.

Since the first wall is arranged on a path from the opening to the substrate in the power control unit of the configuration set forth above, an intrusion of a foreign object towards the substrate can be suppressed. Since the first wall is provided at the terminal block that is directed to connection with an electric circuit, the size and cost of the power control unit can be reduced.

Preferably, the first wall is provided to block the line of sight from outside the casing towards the substrate through the opening. According to the power control unit configured as set forth above, the intrusion of a foreign object towards the substrate can be suppressed more reliably.

Preferably, the casing further includes a rib-like section. The rib-like section is disposed between the substrate and the opening, protruding from the inner edge of the top defining the opening towards inside the casing. The first wall is provided to block the line of sight from outside the casing towards the substrate, through the opening and over the rib-like section. According to the power control unit configured as set forth above, an intrusion of a foreign object towards the substrate can be suppressed further reliably by virtue of the first wall and rib-like section.

Preferably, the casing further includes a rib-like section. The rib-like section is disposed between the substrate and the opening, protruding from the inner edge of the top defining the opening towards inside the casing. The first wall extends in the height direction to a position overlapping with the rib-like section. According to the power control unit configured as set forth above, an intrusion of a foreign object towards the substrate can be suppressed further reliably by virtue of the first wall and rib-like section.

Preferably, the substrate is arranged at a side opposite to the top relative to the terminal block. The terminal block further includes a second wall. The second wall extends in a direction opposite to the first wall, and where the substrate is not present. According to the power control unit configured as set forth above, an intrusion of a foreign object towards the substrate can be suppressed further reliably by virtue of the first wall and second wall.

Preferably, the power control unit further includes a bus bar connected to the terminal block, and a bolt fastening the bus bar to the terminal block. The opening is formed to allow access to the bolt through the opening from outside the casing. According to the power control unit configured as set forth above, an intrusion of a foreign object towards the substrate through the opening for fastening a bolt can be prevented.

Preferably, the power control unit further includes a bus bar connected to the terminal block. The terminal block further includes a joint into which a bolt directed to fastening a bus bar is inserted. When viewed in the direction of inserting a bolt to the joint, the bus bar extends from the joint towards a side opposite to the substrate with the joint therebetween, and the first wall is arranged between the joint and the substrate.

According to the power control unit configured as set forth above, the side opposite to the substrate with the joint therebetween is used as the space where the bus bar is to be arranged. Further, by arranging the first wall between the joint and the substrate at the side where the substrate is disposed, an intrusion of a foreign object towards the substrate can be suppressed.

Preferably, when viewed in the direction of inserting a bolt to the joint, the first wall is arranged at three of the four sides around the joint, excluding the side corresponding to the extending direction of the bus bar. According to the power control unit configured as set forth above, an intrusion of a foreign object towards the substrate can be suppressed further reliably by the enclosure through the first wall at the three sides excluding the side corresponding to the extending direction of the bus bar.

Preferably, the power control unit further includes a bus bar connected to the terminal block, and a power control unit constituent component placed in the casing, and to which the bus bar is connected. The power control unit constituent component has a third wall. The third wall is arranged between the substrate and the opening, and extends between the top and the bus bar towards the top at a circumference of an aperture of the opening.

According to the power control unit configured as set forth above, an intrusion of a foreign object towards the substrate can be suppressed by virtue of the third wall arranged between the substrate and the opening at the site where interference with the bus bar occurs. Since the third wall is provided at a power control unit constituent component originally provided for a purpose differing from the purpose of preventing an intrusion of a foreign object, reduction in the size and cost of the power control unit can be accomplished.

Advantageous Effects of Invention

According to the present invention set forth above, there can be provided a power control unit having an intrusion of a foreign object suppressed while reducing the size and cost.

Figure 1:
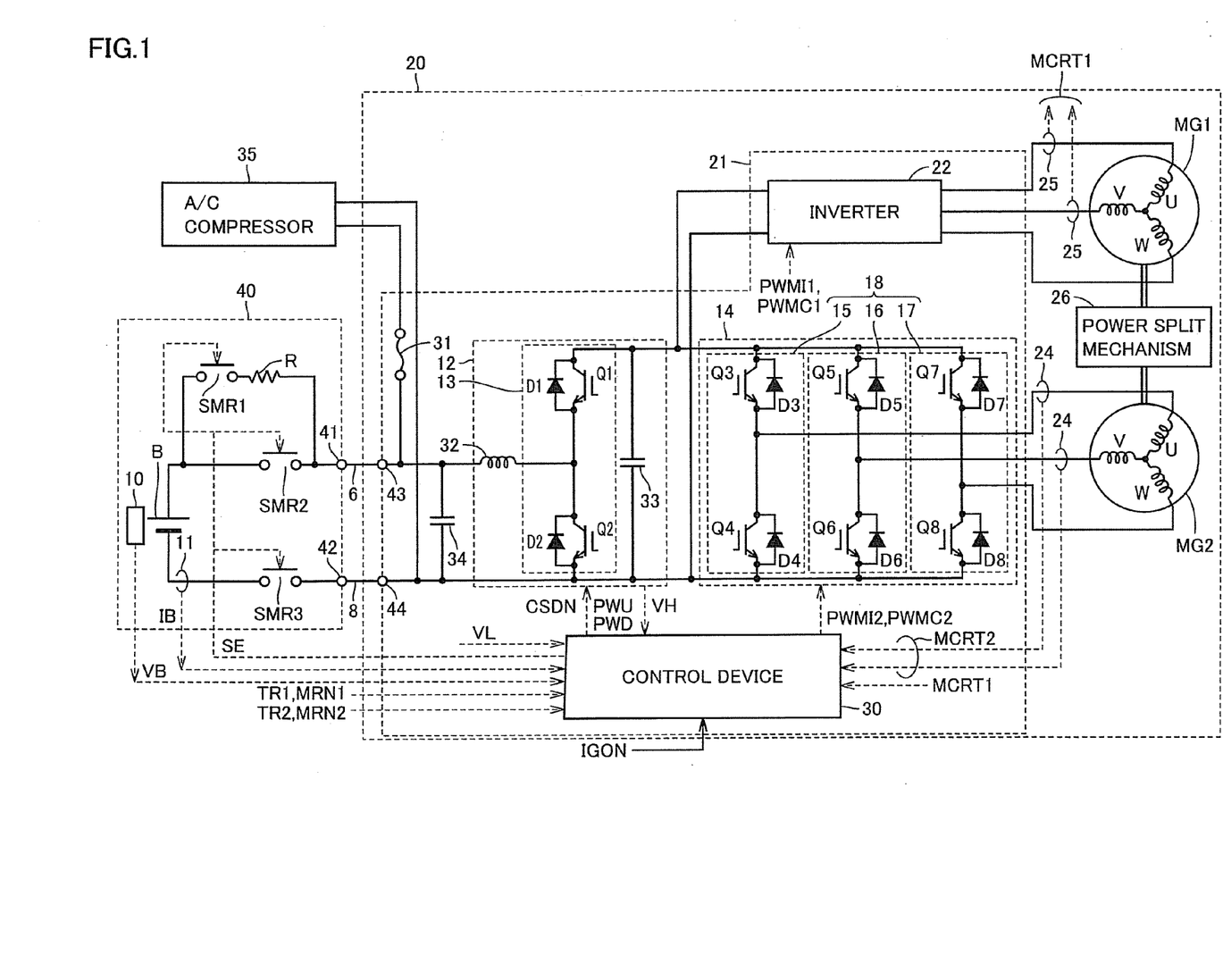
FIG. 1 represents a circuit diagram of a configuration related to motor generator control of a hybrid vehicle.

DESCRIPTION OF EMBODIMENTS (First Embodiment)
FIG. 1 represents a circuit diagram of a configuration related to motor generator control of a hybrid vehicle. The hybrid vehicle employs an internal combustion engine such as a gasoline engine or diesel engine and a motor supplied with electric power from a rechargeable secondary cell (battery) as the power source.

Referring to FIG. 1, the hybrid vehicle includes a battery unit 40, a vehicle driving device 20, and an engine not shown. Vehicle driving device 20 includes motor generators MG1 and MG2, a power split mechanism 26 for dividing the power between the engine not shown and motor generators MG1, MG2, and a power control unit (PCU) 21 for controlling the electric power transferred between battery unit 40 and motor generators MG1, MG2.

Motor generator MG1 mainly functions as a generator to generate electric power through an output from the engine. Motor generator MG1 also acts as a starter at the time of starting the engine. Motor generator MG2 mainly functions as a motor, assisting the output of the engine to increase the driving power. Motor generator MG2 generates power in a regenerative braking mode to charge a battery B.

Terminals 41 and 42 are provided at battery unit 40. DC terminals 43 and 44 are provided at PCU 21. Electrical connection between terminal 41 and DC terminal 43, and between terminal 42 and DC terminal 44 is established by cables 6 and 8, respectively.

Battery unit 40 includes battery B, a system main relay SMR2 connected between the positive electrode of battery B and terminal 41, a system main relay SMR3 connected between the negative electrode of battery B and terminal 42, and a system main relay SMR1 and a limiting resistor R connected in series between the positive electrode of battery B and terminal 41. System main relays SMR1-SMR3 have their conductive/non-conductive state controlled according to a control signal SE applied from a control device 30 that will be described afterwards.

Battery unit 40 includes a voltage sensor 10 measuring a voltage VB across the terminals of battery B, and a current sensor 11 sensing a current IB flowing through battery B. For battery B, a secondary battery such as of nickel-metal hydride, lithium ions or the like, or a fuel cell battery may be used. As a power storage device alternative to battery B, a capacitor of a large capacitance such as an electric double layer capacitor may be used.

PCU 21 includes inverters 22 and 14 provided corresponding to motor generators MG1 and MG2, respectively, a boost converter 12 provided common to inverters 22 and 14, and a control device 30.

Boost converter 12 boosts the voltage between DC terminal 43 and DC terminal 44. Boost converter 12 includes a reactor 32 having one end connected to DC terminal 43, a boosting IPM (Intelligent Power Module) 13, and a smoothing capacitor 33. Boosting IPM 13 includes IGBT elements Q1 and Q2 connected in series between the output terminals of boost converter 12 providing boosted voltage VH, and diodes D1 and D2 connected parallel to IGBT elements Q1 and Q2, respectively. Smoothing capacitor 33 is provided between boost converter 12 and inverters 22, 14. Smoothing capacitors 33 suppresses voltage and current variation on part of inverters 22 and 14 that correspond to the high voltage side.

PCU 21 includes a smoothing capacitor 34, which is provided between battery B and boost converter 12. Smoothing capacitor 34 suppresses the voltage and current variation on part of battery B that corresponds to the low voltage side.

Reactor 32 has the other end connected to the emitter of IGBT element Q1 and the collector of IGBT element Q2. Diode D1 has its cathode connected to the collector of IGBT element Q1 and its anode connected to the emitter of IGBT element Q1. Diode D2 has its cathode connected to the collector of IGBT element Q2 and its anode connected to the emitter of IGBT element Q2.

The hybrid vehicle includes an A/C (air conditioner) compressor 35. A/C compressor 35 is connected between the input lines of boost converter 12 such that electric power is supplied from battery B.

Inverter 14 converts the DC voltage output from boost converter 12 into 3-phase alternating current for output to motor generator MG2 driving the wheel. Inverter 14 returns the electric power generated at motor generator MG2 to boost converter 12 in accordance with regenerative braking. At this stage, boost converter 12 is under control of control device 30 to operate as a down-converting circuit.

Inverter 14 includes a U-phase arm 15, a V-phase arm 16 and a W-phase arm 17 constituting a traction IPM 18. U-phase arm 15, V-phase arm 16 and W-phase arm 17 are connected in parallel between the output lines of boost converter 12.

U-phase arm 15 includes IGBT elements Q3 and Q4 connected in series, and diodes D3 and D4 connected parallel to IGBT elements Q3 and Q4, respectively. Diode D3 has its cathode connected to the collector of IGBT element Q3 and its anode connected to the emitter of IGBT element Q3. Diode D4 has its cathode connected to the collector of IGBT element Q4 and its anode connected to the emitter of IGBT element Q4.

V-phase arm 16 includes IGBT elements Q5 and Q6 connected in series, and diodes D5 and D6 connected parallel to IGBT elements Q5 and Q6, respectively. Diode D5 has its cathode connected to the collector of IGBT element Q5 and its anode connected to the emitter of IGBT element Q5. Diode D6 has its cathode connected to the collector of IGBT element Q6 and its anode connected to the emitter of IGBT element Q6.

W-phase arm 17 includes IGBT elements Q7 and Q8 connected in series, and diodes D7 and D8 connected parallel to IGBT elements Q7 and Q8, respectively. Diode D7 has its cathode connected to the collector of IGBT element Q7 and its anode connected to the emitter of IGBT element Q7. Diode D8 has its cathode connected to the collector of IGBT element Q8 and its anode connected to the emitter of IGBT element Q8.

The intermediate point of each phase arm is connected to each phase end of each phase coil of motor generator MG2. In other words, motor generator MG2 is a three-phase permanent magnet type synchronous motor. The three coils of the U, V, and W-phase each have one end connected common to the intermediate point. The U-phase coil has the other end connected to the connection node of IGBT elements Q3 and Q4. The V-phase coil has the other end connected to the connection node of IGBT elements Q5 and Q6. The W-phase coil has the other end connected to the connection node of IGBT elements Q7 and Q8.

Current sensor 25 detects the current flowing through motor generator MG1 as a motor current value MCRT1, which is output to control device 30. Current sensor 24 detects the current flowing through motor generator MG2 as a motor current value MCRT2, which is output to control device 30.

Inverter 22 is connected parallel to inverter 14 relative to boost converter 12. Inverter 22 converts the DC voltage output from boost converter 12 into a three-phase alternating current for output to motor generator MG1. Inverter 22 receives the boosted voltage from boost converter 12 to drive motor generator MG1 to start the engine, for example.

Further, inverter 22 returns the electric power generated at motor generator MG1 by the rotation torque transmitted from the crankshaft of the engine to boost converter 12. At this stage, boost converter 12 is under control of control device 30 to operate as a down-converting circuit. Since the configuration in inverter 22 is similar to that of inverter 14, detailed description thereof will not be repeated.

Control device 30 receives torque command values TR1 and TR2, motor revolution speeds MRN1 and MRN2, various values of voltages VB, VL, VH, and current IB, motor current values MCRT1 and MCRT2, and an activation signal IGON.

As used herein, torque command value TR1, motor revolution speed MRN1 and motor current value MCRT1 relate to motor generator MG1, whereas torque command value TR2, motor revolution speed MRN2 and motor current value MCRT2 relate to motor generator MG2. Voltage VB is the voltage of battery B, and current IB is the current flowing to battery B. Voltage VL is the voltage before being boosted by boost converter 12, whereas voltage VH is the voltage after being boosted by boost converter 12.

Control device 30 outputs a control signal PWU directed to instructing boosting, a control signal PWD directed to instructing down-conversion, and a signal CSDN directed to instructing operation prohibition towards boost converter 12.

Control device 30 outputs to inverter 14 a drive instruction PWMI2 for converting DC voltage output from boost converter 12 into AC voltage directed to driving motor generator MG2, and a regeneration instruction PWMC2 directed to converting the AC voltage generated at motor generator MG2 into DC voltage and returning the DC voltage towards boost converter 12. Control device 30 outputs to inverter 22 a drive instruction PWMI1 for converting DC voltage into AC voltage directed to driving motor generator MG1, and a regeneration instruction PWMC1 directed to converting the AC voltage generated at motor generator MG1 into DC voltage and returning the DC voltage towards boost converter 12.

Figure 2:
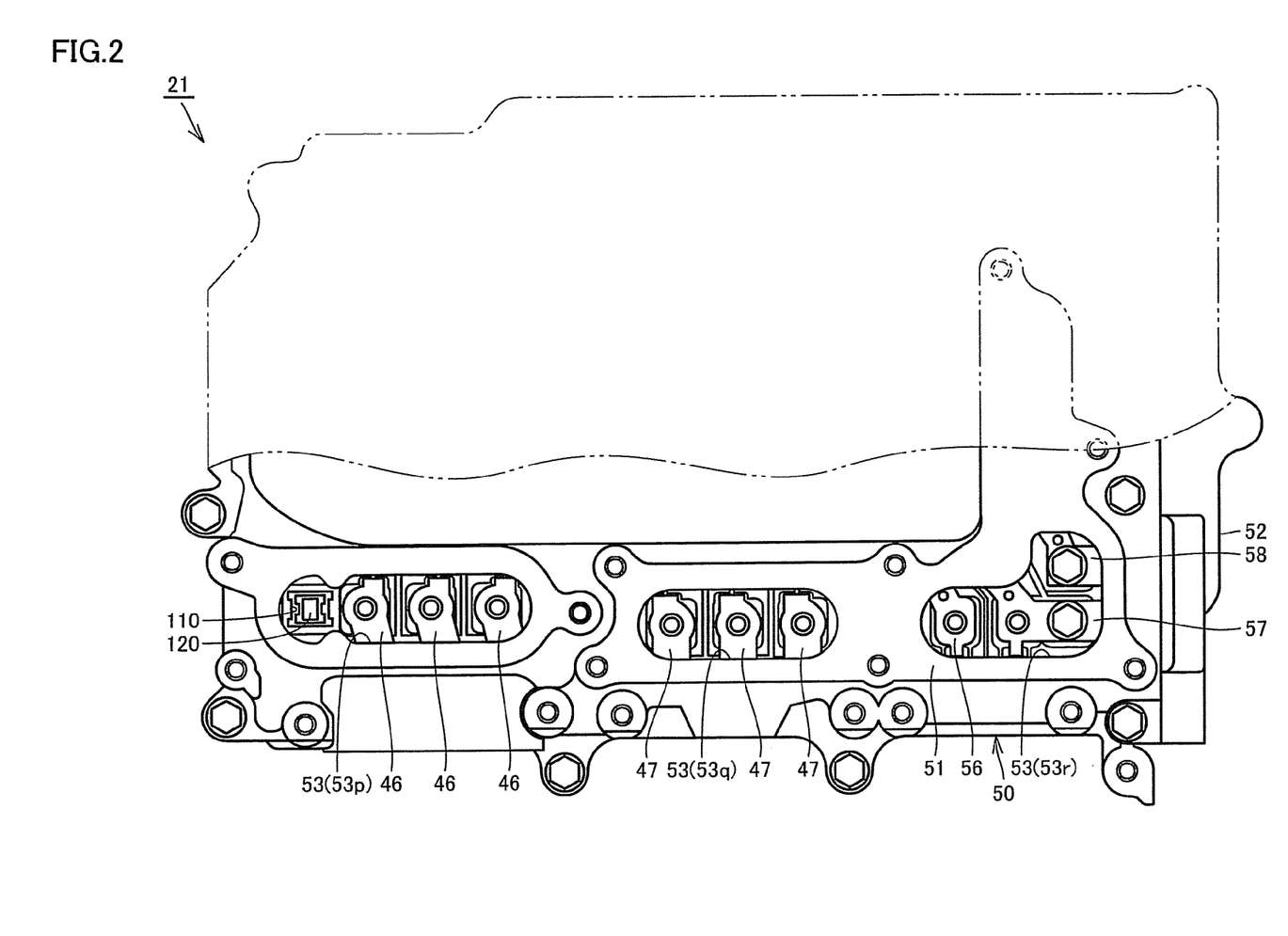
FIG. 2 is a top view of the power control unit of FIG. 1.

A configuration of power control unit 21 in FIG. 1 will be described hereinafter with reference to FIG. 2 representing a top view of the power control unit of FIG. 1.

Referring to FIG. 2, power control unit 21 includes a PCU case 50. PCU case 50 corresponds to the outer appearance of power control unit 21. PCU case 50 is formed of a metal such as aluminum.

PCU case 50 includes a case body 52 and a top cover 51. Case body 52 takes the shape of a casing that opens upwards. Top cover 51 is attached to case body 52 to cover the opening of case body 52. Top cover 51 constitutes one side face of PCU case 52 corresponding to the upper side in the vertical direction.

An opening 53p, an opening 53q and an opening 53r (hereinafter, generically referred to as opening 53 when discrimination therebetween is not particularly required) are formed at top cover 51. Opening 53p, opening 53q and opening 53r are formed spaced apart from each other. Opening 53 is formed to allow communication between the outer side and inner side of PCU case 50. Opening 53 penetrates top cover 51 in the vertical direction from the outer side of PCU case 50 into the inner side of PCU case 50.

Figure 3:
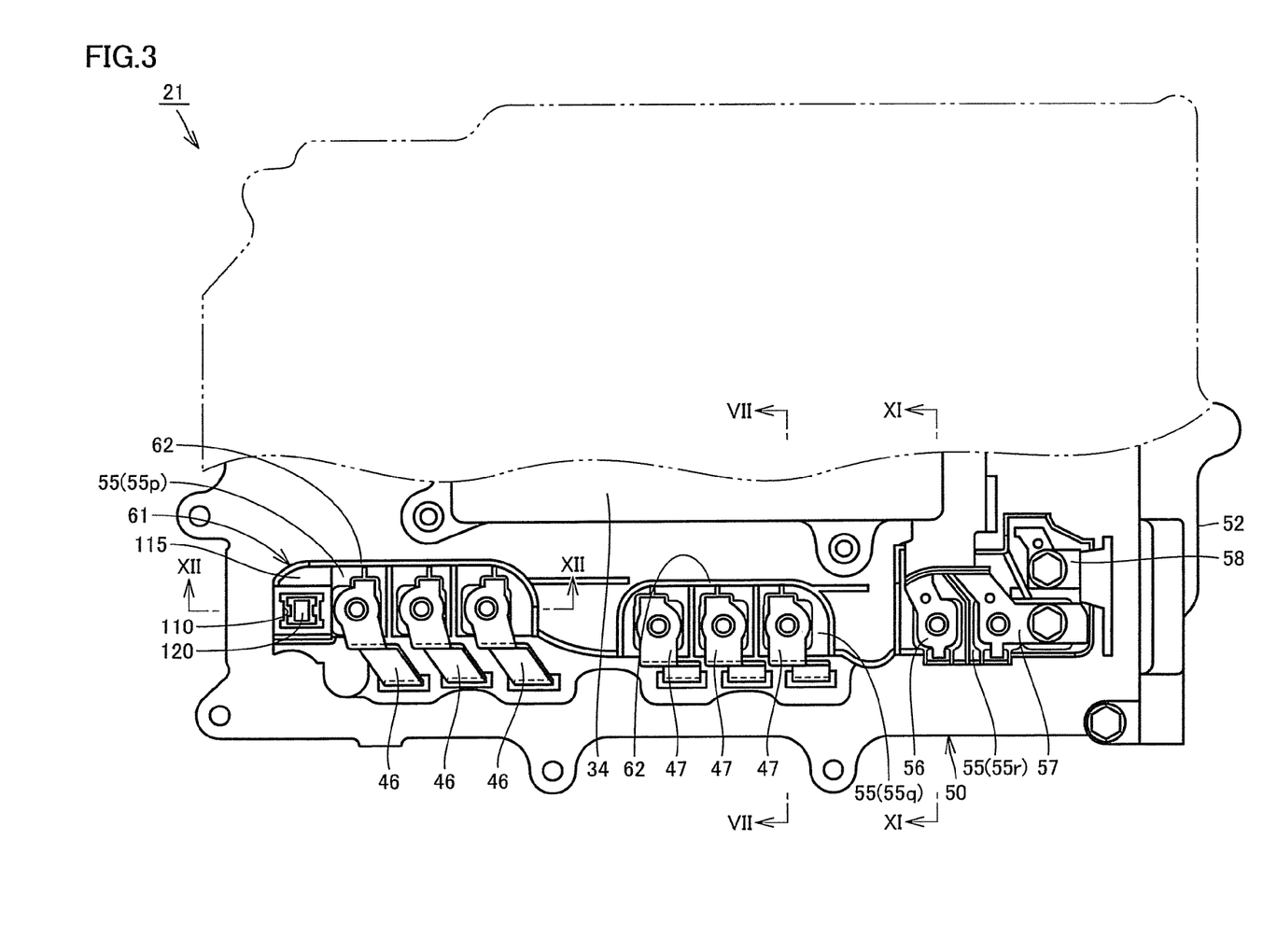
FIG. 3 is a top view of the power control unit of FIG. 1 in a state having the top cover removed.

FIG. 3 is a top view of the power control unit of FIG. 1 in a state having the top cover removed. Referring to FIGS. 2 and 3, power control unit 21 further includes a terminal block 61. Terminal block 61 is placed in PCU case 50. Terminal block 61 is arranged at the back side of top cover 51. Terminal block 61 is arranged adjacent to top cover 51 inside PCU case 50. Terminal block 61 is arranged to face opening 53 formed at top cover 51.

Figure 4:
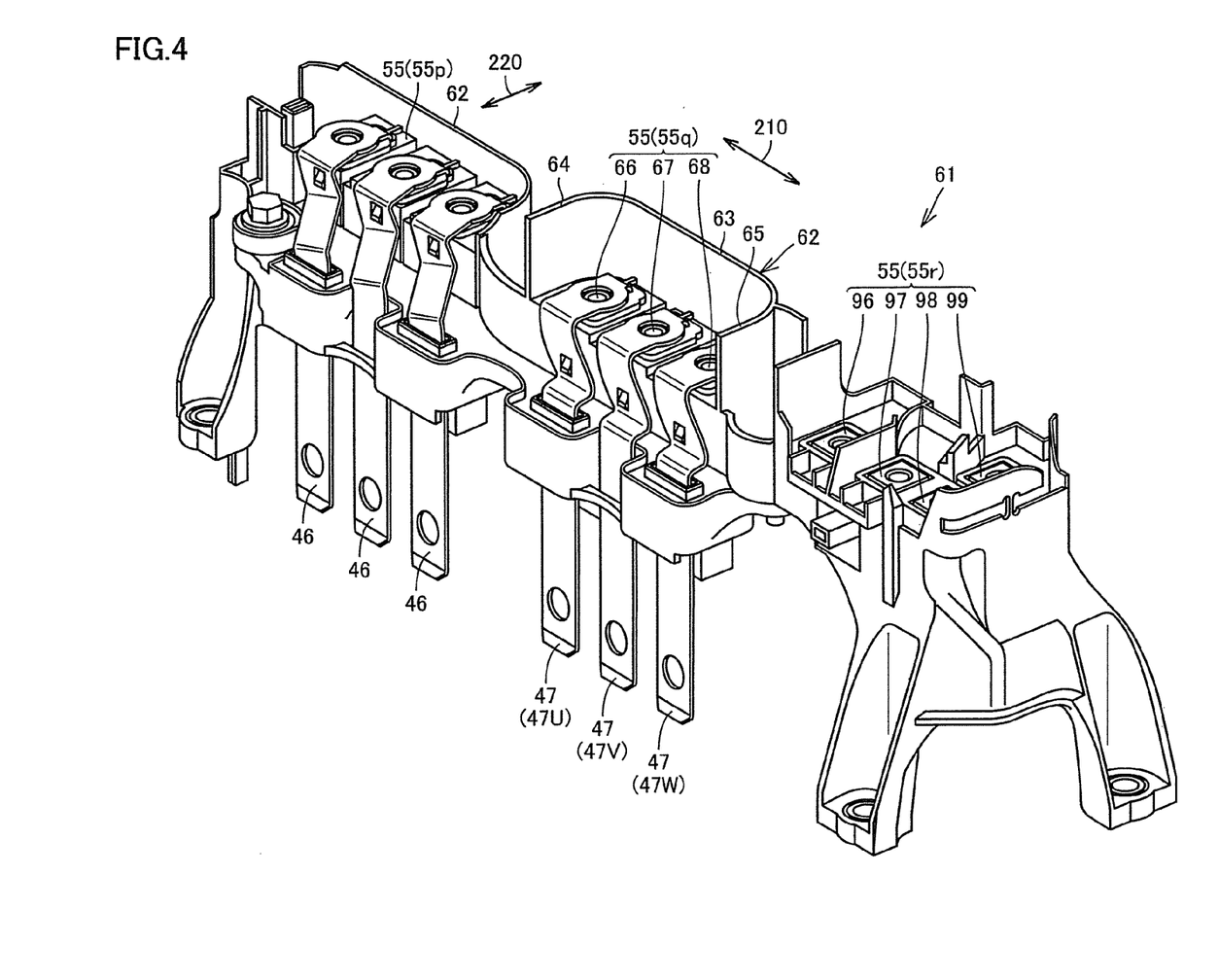
FIG. 4 is a perspective view of the terminal block in FIG. 3 viewed from the front side.
Figure 5:
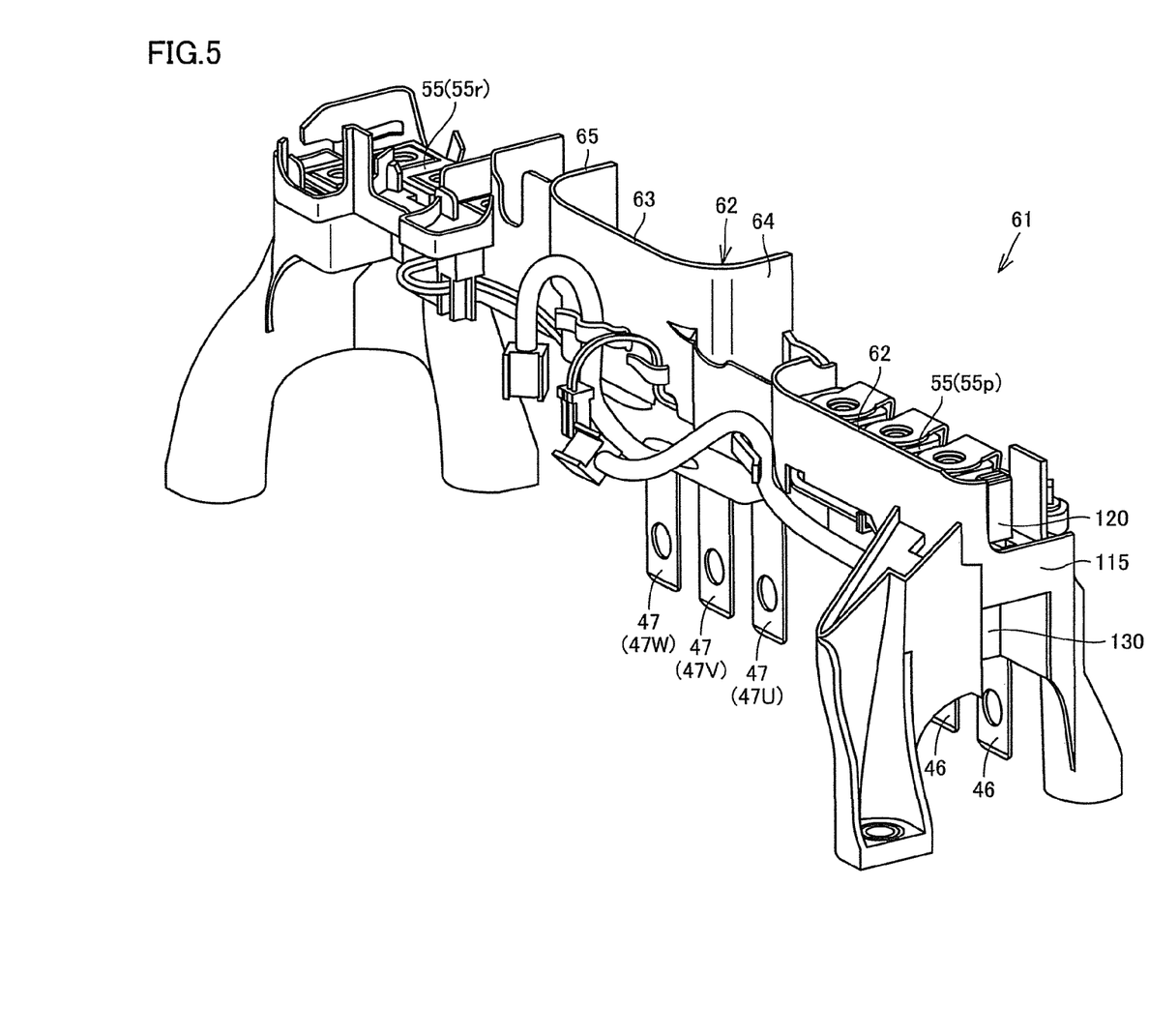
FIG. 5 is a perspective view of the terminal block in FIG. 3 viewed from the rear side.

FIGS. 4 and 5 are perspective views of the terminal block of FIG. 3 viewed from the front side and rear side, respectively. Referring to FIGS. 3-5, terminal block 61 is made of resin. Terminal block 61 is made of an insulative material. Terminal block 61 is formed integrally by resin-molding.

As constituent members, terminal block 61 includes a joint 55p, a joint 55q and a joint 55r (hereinafter, generically referred to as joint 55 when discrimination therebetween is not particularly required). Joints 55p, 55q and 55r are arranged aligned in one direction indicated by arrow 210 in FIG. 4. Joints 55p, 55q and 55r are formed at a location facing openings 53p, 53q and 53r, respectively.

In an assembling mode of a hybrid vehicle, power control unit 21 as well as motor generators MG1, MG2 and battery unit 40 are attached to the vehicle body, and electrical connection is established between these units by cable. At this stage, a bus bar (for example, bus bar 86 shown in FIG. 7) is fastened to joint 55 by means of a bolt. Opening 53 is formed to allow access to the bolt by a worker inserting a tool such as a wrench during the assembly procedure.

Power control unit 21 includes a plurality of bus bars 46 and a plurality of bus bars 47. Bus bars 46 and bus bars 47 are connected to joint 50p and joint 50q, respectively. Joint 55p serves to establish electrical connection between motor generator MG1 and inverter 22 in FIG. 1. Joint 55q serves to establish electrical connection between motor generator MG2 and inverter 14 in FIG. 1.

The manner of joint 55q and bus bars 47 connected to joint 55q will be described representative thereof. A U-phase joint 66, a V-phase joint 67 and W-phase joint 68 provided corresponding to the U-phase, V-phase, and W-phase of motor generator MG2, respectively, constitute joint 55q. U-phase joint 66, V-phase joint 67 and W-phase joint 68 are provided aligned in the direction indicated by arrow 210. Joint 55q takes the shape of substantially a rectangle in plan view having the aligning direction of U-phase joint 66, V-phase joint 67 and W-phase joint 68 corresponding to the longitudinal direction and the direction orthogonal thereto (the direction indicated by arrow 220 in FIG. 4) corresponding to the shorter side direction.

A U-phase bus bar 47U, a V-phase bus bar 47V and a W-phase bus bar 47W provided corresponding to the U-phase, V-phase, and W-phase, respectively, of motor generator MG2 constitute the plurality of bus bars 47. U-phase bus bar 47U, V-phase bus bar 47V and W-phase bus bar 47W have one end connected to U-phase joint 66, V-phase joint 67 and W-phase joint 68, respectively, and the other end connected to U-phase arm 15, V-phase arm 16 and W-phase arm 17, respectively, of traction IPM 18 in FIG. 1.

Bus bar 47 extends from joint 55q in one direction along the direction indicated by arrow 220 in FIG. 4 (the direction orthogonal to the direction indicated by arrow 210), and is further bent vertically downwards.

Joint 55p and bus bars 46 are provided in a manner similar to those of joint 55q and bus bars 47.

Power control unit 21 further includes a bus bar 56, a bus bar 57, and a bus bar 58. Bus bars 56, 57 and 58 are fastened to joint 55r.

A first joint 96, a second joint 97, a third joint 98, and a fourth joint 99 constitute joint 55r. Bus bar 56 is connected to first joint 96. Bus bar 57 is connected to second joint 97 and third joint 98. Bus bar 58 is connected to fourth joint 99. First joint 96 serves to electrically connect DC terminal 43 in FIG. 1 with smoothing capacitor 34 and reactor 32. Second and third joints 97 and 98 serve to electrically connect DC terminal 44 in FIG. 1 with A/C compressor 35 and smoothing capacitor 34. Fourth joint 99 serves to electrically connect DC terminal 44 in FIG. 1 with A/C compressor 35 via a fuse 31.

As shown in FIG. 2, bus bars 56, 57 and 58 extend from joint 55r in a direction opposite to bus bars 46 and 47.

Figure 6:
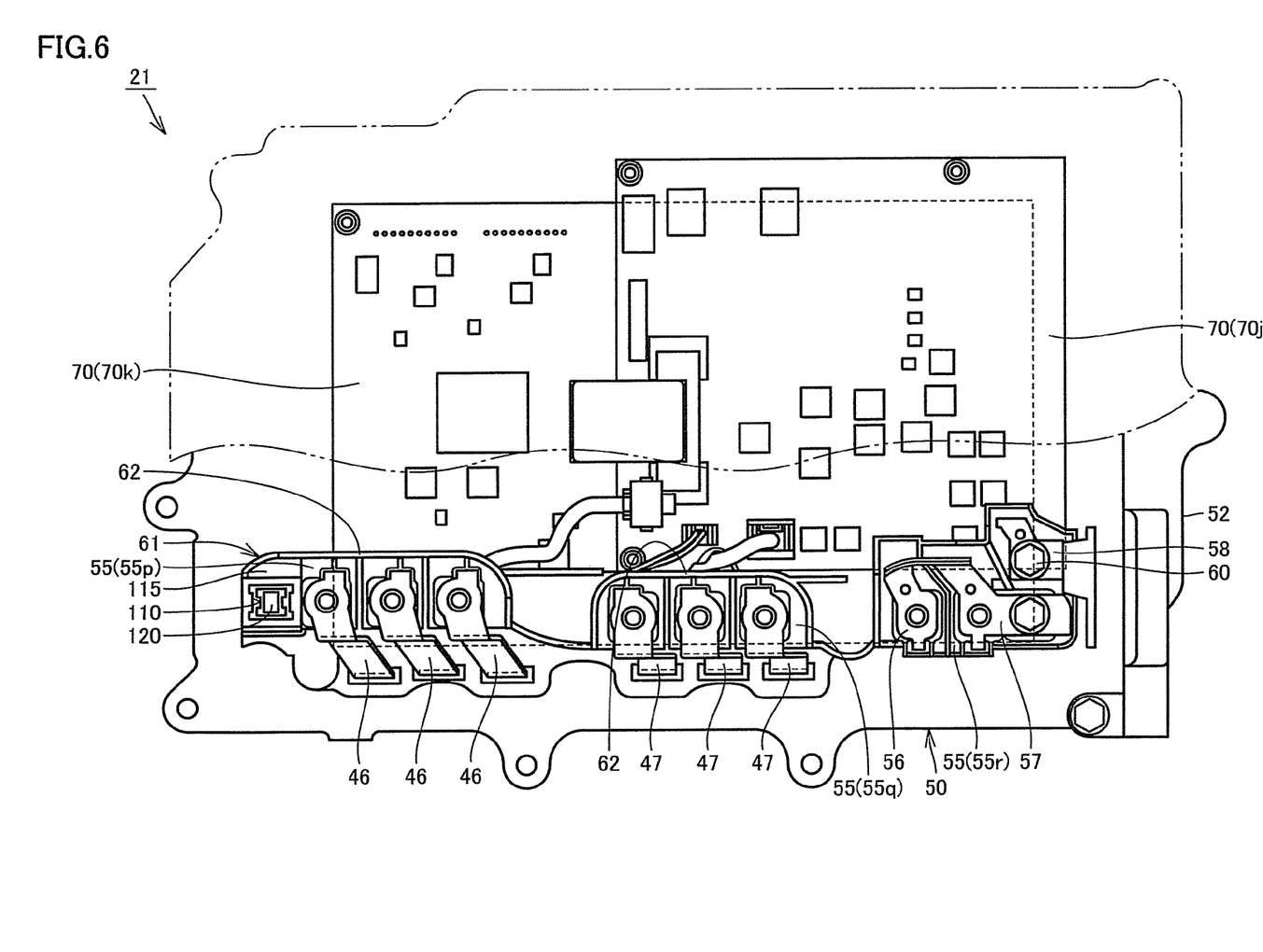
FIG. 6 is a top view of a substrate placed in a PCU case in FIG. 3.
Figure 7:
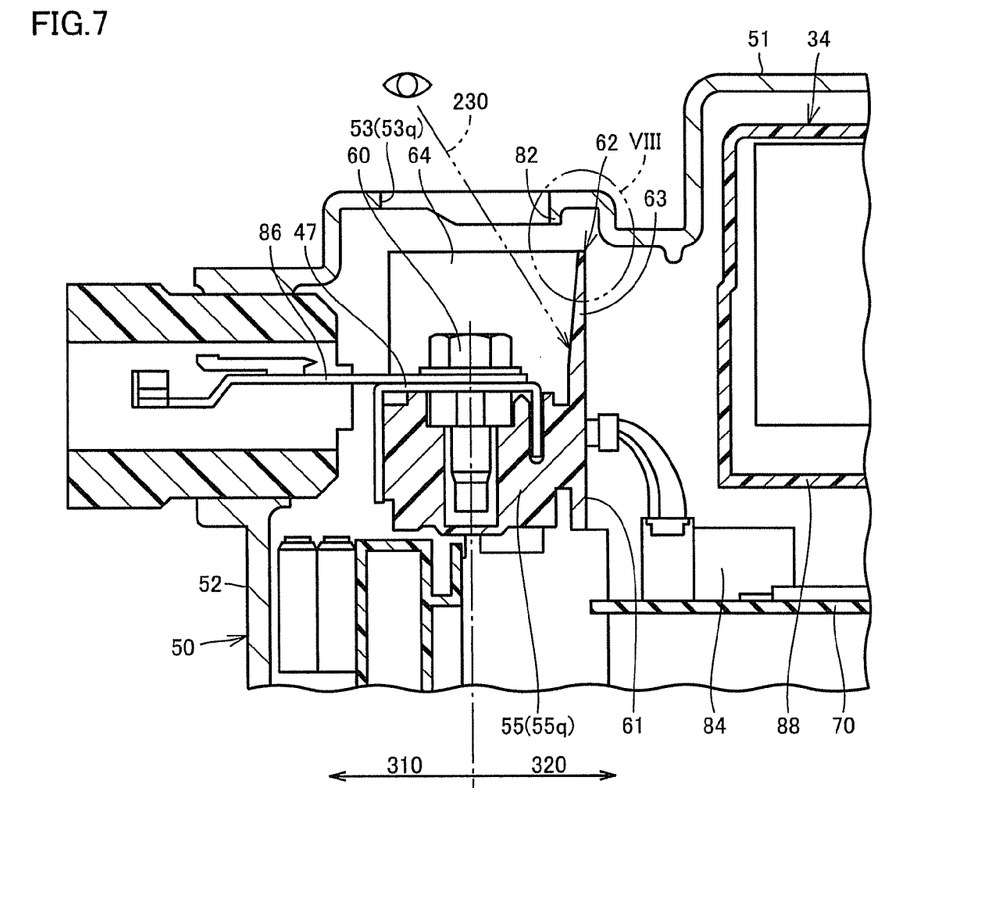
FIG. 7 is a sectional view of the power control unit taken along line VII-VII of FIG. 3.

FIG. 6 is a top view of the substrate placed in the PCU case of FIG. 3. FIG. 7 is a sectional view of the power control unit taken along line VII-VII of FIG. 3.

Referring to FIGS. 6 and 7, power control unit 21 includes a substrate 70k and a substrate 70j (hereinafter, referred generically as substrate 70 when discrimination therebetween is not particularly required). Substrate 70 is placed in PCU case 50. Substrate 70 is arranged adjacent to terminal block 61 inside PCU case 50. Substrate 70 is arranged to extend in plane, facing top cover 51. Substrate 70 takes the shape of a flat panel of substantially a rectangle. Substrate 70 constitutes control device 30 of FIG. 1, having an electric component 84 such as a resistor, diode, IC chip, transistor or the like mounted on the surface.

Smoothing capacitor 34 is placed in PCU case 50. Smoothing capacitor 34 is arranged between top cover 51 and substrate 70. In the top side view of FIG. 6, smoothing capacitor 34 is positioned overlapping with substrate 70. In the top side view of FIG. 6, smoothing capacitor 34 and terminal block 61 are arranged side by side with substrate 70 thereunder.

Referring to FIG. 7, joint 55q has bus bar 86 fastened by means of a bolt 60. Bus bar 86 is overlapped with bus bar 47 on joint 55q. Opening 53q is formed on the line of extension of the rotation axis of bolt 60.

Bus bar 86 extends from joint 55q in a direction opposite to substrate 70 and smoothing capacitor 34 relative to joint 55q. A cable extending from motor generator MG2 in FIG. 1 is connected to bus bar 86. When the space in PCU case 50 is divided into first space 310 corresponding to the left side and second space 320 corresponding to the right side about the rotation axis of bolt 60, bus bar 47 and bus bar 86 extend from joint 55q towards first space 310. Substrate 70 and smoothing capacitor 34 are arranged in second space 320.

The configuration of a wall 62 provided at terminal block 61 will be described hereinafter.

Referring to FIGS. 4 and 7, terminal block 61 includes a wall 62 in power control unit 21 of the present embodiment.

Wall 62 is formed integrally with terminal block 61. Wall 62 is formed by resin-molding integrally with joint 55q.

Wall 62 is arranged between opening 53q and substrate 70. Wall 62 is arranged to cross a straight line connecting opening 53q and substrate 70. Substrate 70 is arranged at the reverse side of wall 62 when viewed from opening 53q. Wall 62 extends from joint 55q towards top cover 51 at a circumference of the aperture of opening 53q. Wall 62 extends from joint 55q substantially upwards in the perpendicular direction. Wall 62 is arranged in PCU case 50 inner than opening 53r. In viewing opening 53r from a penetrating direction (perpendicular direction) of top cover 51, wall 62 is located hidden at the back side of top cover 51. There is a gap between the leading end of wall 62 and top cover 51. Wall 62 is provided to block the line of sight 230 from outside PCU case 50 towards substrate 70 through opening 53.

A back section 63, a side section 64, and a side section 65 constitute wall 62. Back section 63 is arranged at the side opposite to the side where bus bars 47 and 86 extend. Back section 63 is located in second space 320. Side sections 64 and 65 are bent from the two edges of back section 63 to extend towards the extending direction of bus bars 47 and 86. When viewed from the direction of inserting bolt 60 relative to joint 55q, back section 63, side section 64 and side section 65 correspond to three of the four sides around joint 55q, excluding the side from which bus bars 47 and 86 extend.

Although the manner of wall 62 provided at joint 55q has been described in the foregoing, a wall 62 is provided at joint 55p in a similar manner.

During the transfer of power control unit 21 to the assembly plant of the hybrid vehicle or during assembly of power control unit 21 to the vehicle body, one concern is an intrusion of a foreign object, whether fluid or solid, into PCU case 50 through opening 53. Moreover, a possible case is joint 55 having to be threaded again, if the bolt is inserted in an inclined manner at the time of fastening the bus bar to terminal block 61, leading to the possibility of a foreign object that was generated at this stage entering PCU case 50. An intrusion of such a foreign object towards substrate 70 will degrade the reliability of substrate 70 serving as a control device.

Measures to solve such problems may include the provision of a cover for substrate 70, applying a coat on the surface of substrate 70, and eliminating any gap around terminal block 61 by means of a gasket, sponge, or the like. However, if a cover is provided for substrate 70, the space to attach the cover is required, so that the power control unit cannot be reduced in size, which is against the intention of reducing the size, or fabrication cost caused by the requirement of an additional component. If substrate 70 is coated, there is a possibility of a small hole being formed in the coat to allow an intrusion of a foreign object. There is also a possibility of a foreign object sinking into the coat, which will not ensure insulation of substrate 70 from the foreign object. Furthermore, the necessity of an additional coating step will increase the fabrication cost. In the case where the gap around terminal block 61 is to be eliminated by means of a gasket or sponge, additional space will be required for such sealing, disallowing reduction in the size of power control unit 21 or causing increase of fabrication cost by the addition of a sealing member.

In power control unit 21 of the present embodiment, wall 62 is provided to block the path from openings 53p and 53q to substrate 70. By such a configuration, the travel of a foreign object intruding into PCU case 50 through openings 53p and 53q towards substrate 70 can be prevented. Since wall 62 is formed integrally with terminal block 61, reduction in the cost and size of power control unit 21 can be achieved.

Particularly in the present embodiment, three of the four sides around joint 55p and joint 55q are enclosed by wall 62, excluding the side corresponding to the extending direction of the bus bar. Accordingly, even if a foreign object intrudes through openings 53p, 53q onto joints 55p, 55q or a bolt falls off from joints 55p, 55q inadvertently during the fastening work, the direct travel of a foreign object or bolt to substrate 70 can be prevented. Even if such a foreign object or bolt enters first space 310 from a site where wall 62 is not present, the arrangement of substrate 70 at the second space allows the prevention against a foreign object or bolt reaching substrate 70.

Since substrate 70 takes the shape of a flat panel spreading in plane, the area of substrate 70 occupies a large ratio of power control unit 21 in plan view. It is to be noted that terminal block 61 is arranged in the proximity of the side face of PCU case 50 for the connection of an external cable to terminal block 61. If substrate 70 must be separated greatly apart from terminal block 61, the area of PCU case 50 must be increased in plan view of power control unit 21. In the present embodiment, substrate 70 can be arranged in the proximity of terminal block 61 by overcoming the concern of the intrusion of a foreign object towards substrate 70. As a result, power control unit 21 can be reduced in size effectively.

Figure 8:
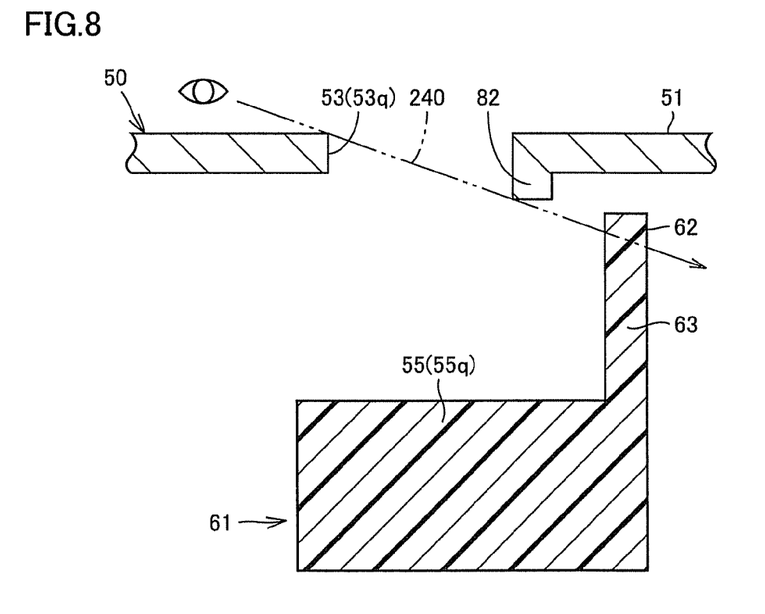
FIG. 8 is a sectional view of an enlargement of the range encircled by a chain line with the two dots VIII in FIG. 7.

FIG. 8 is a sectional view of an enlargement of the range encircled by a chain line with the two dots VIII in FIG. 7. Referring to FIG. 8, PCU case 50 includes a rib-like section 82. Rib-like section 82 is formed at top cover 51. Rib-like section 82 protrudes from the inner edge of top cover 51 defining opening 53q, inward of PCU case 50. Rib-like section 82 is formed trailing downwards perpendicularly from the inner edge of top cover 51 defining opening 53q. Rib-like section 82 is located between opening 53q and substrate 70. Rib-like section 82 is formed in PCU case 50 at an inner side than opening 53r, and closer to opening 53r than wall 62.

At power control unit 21 of the present embodiment, wall 62 is provided to block the line of sight 240 from outside PCU case 50 towards substrate 70, through opening 53q and over rib-like section 82. Since PCU case 50 is substantially a sealed casing in which no air flow occurs, any foreign object entering PCU case 50 through opening 53q will fall downwards substantially perpendicularly. By virtue of wall 62 provided to block the line of sight 240 over rib-like section 82, the travel of a foreign object towards substrate 70 can be prevented more reliably.

Figure 9:
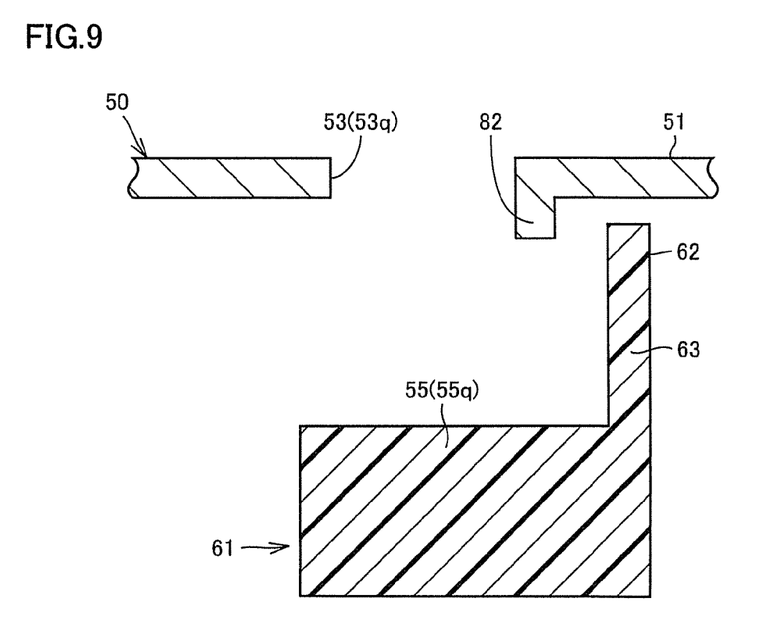
FIG. 9 is a sectional view of a first modification of the power control unit shown in FIG. 8.

FIG. 9 is a sectional view representing a first modification of the power control unit of FIG. 8. Referring to FIG. 9, wall 62 extends as high as to a position overlapping with rib-like section 82 in the height direction (perpendicular direction) in the present modification. Such a configuration allows the travel of a foreign object towards substrate 70 to be prevented further reliably.

Figure 10:
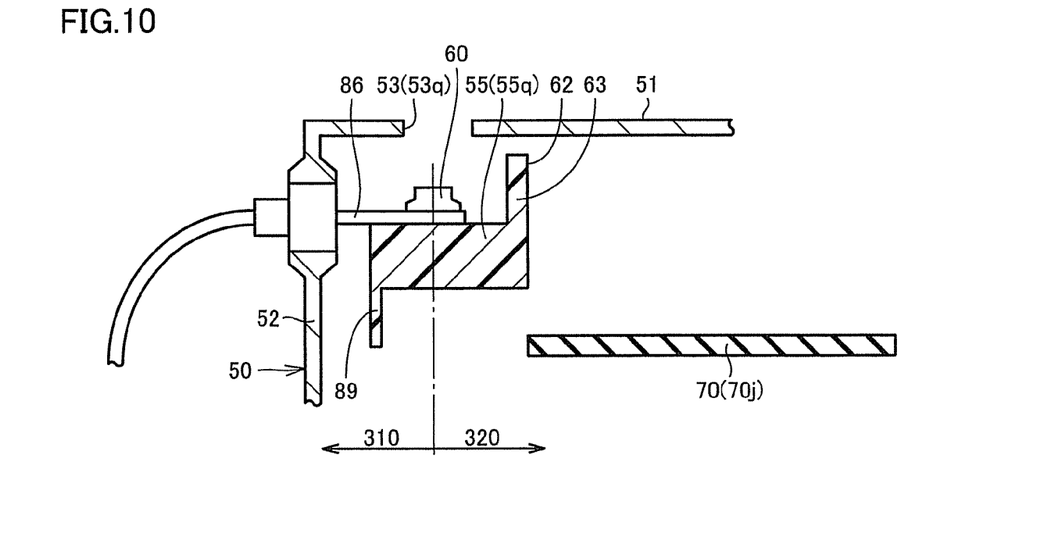
FIG. 10 is a sectional view of a second modification of the power control unit shown in FIG. 8.

FIG. 10 is a sectional view representing a second modification of the power control unit of FIG. 8. Referring to FIG. 10, terminal block 61 further includes a wall 89 that is a second wall, in addition to wall 62 in the present modification. Wall 89 extends from joint 55q in a direction opposite to wall 62 (perpendicularly downwards). Wall 89 is provided out of position from between terminal block 61 and substrate 70. In other words, substrate 70 is not located on the line of extension of wall 89 extending from joint 55q. Wall 89 is provided at first space 310. Wall 89 extends in the height direction (perpendicular direction) such that at least a portion of wall 89 overlaps with substrate 70.

By such a configuration, any foreign object entering PCU case 50 can be prevented from moving around joint 55q from first space 310 towards substrate 70 by virtue of wall 89.

Although the provision of wall 62 and wall 89 at joint 55q has been described with reference to FIGS. 8-10, wall 62 and wall 89 are provided at joint 55p in a similar manner.

Figure 11:
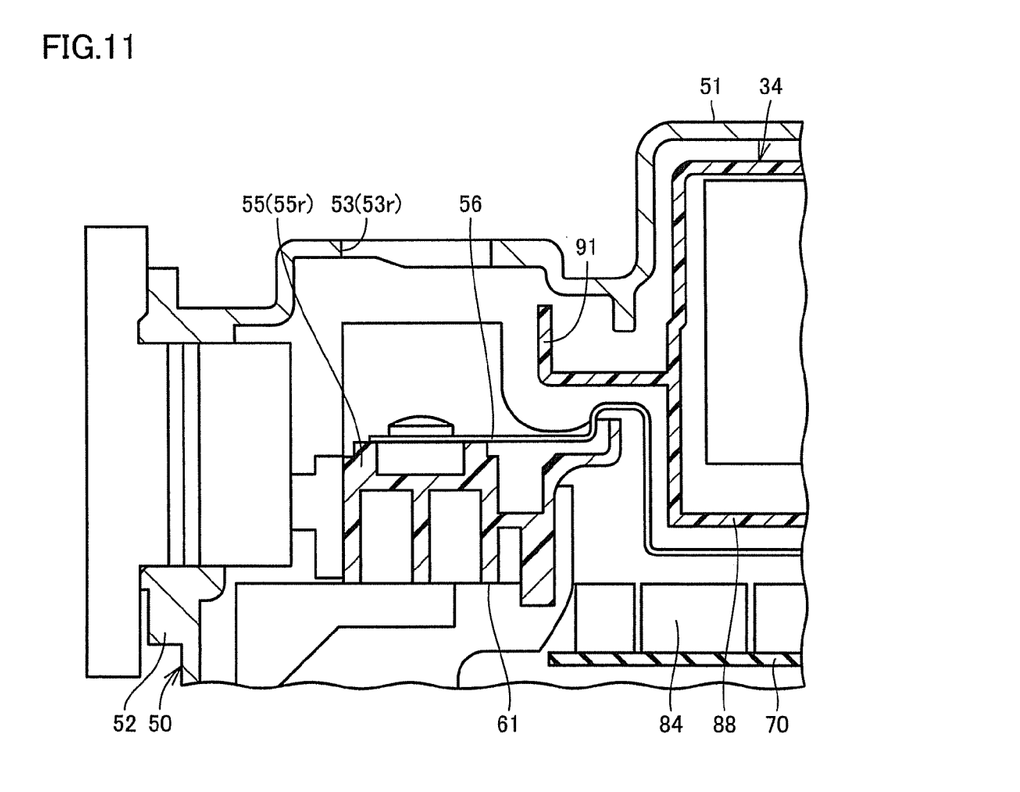
FIG. 11 is a sectional view of the power control unit taken along line XI-XI in FIG. 3.

FIG. 11 is a sectional view of the power control unit taken along line XI-XI in FIG. 3. Referring to FIG. 11, smoothing capacitor 34 includes a wall 91 in power control unit 21 of the present embodiment. Wall 91 is provided integrally with smoothing capacitor 34 to which one ends of bus bars 56 and 57 are connected. Wall 91 is arranged between opening 53r and substrate 70. Wall 91 extends from a capacitor case 88 that is the outer covering of smoothing capacitor 34 towards terminal block 61, and then bends towards top cover 51 at a circumference of the aperture of opening 53r. Wall 91 is located between bus bars 56 and 57 (refer to FIG. 3) and a top cover 51. Wall 91 is arranged opposite to bus bars 56 and 57.

Since bus bars 56 and 57 extend towards the side of substrate 70 at joint 55r, a wall cannot be formed at joint 55r. In the present embodiment, an intrusion of a foreign object towards substrate 70 through opening 53r is prevented by wall 91 extending from capacitor case 88 towards top cover 51 at a circumference of the aperture of opening 53r. Since wall 91 is provided integrally with an existing smoothing capacitor 34 as a component that constitutes power control unit 21, reduction in cost and size of a power control unit 21 can be achieved likewise with the previous case.

The power control unit constituent component for providing wall 91 is not limited to smoothing capacitor 34. For example, if the component connected to bus bars 56 and 57 is boosting IPM 13, wall 91 may be formed integrally with boosting IPM 13. In the case where there is a heat source in PCU case 50 and wall 91 is arranged to block the heat source from substrate 70, wall 91 also serves to suppress heat transfer from the heat source to substrate 70.

The configuration of a power control unit according to a first embodiment of the present invention is summarized in the following. Power control unit 21 of the present embodiment is mounted on a hybrid automobile that is a vehicle, and controls the power to be used for driving the vehicle. Power control unit 21 includes a PCU case 50 as the casing, having a top cover 51 as the top, and an opening 53 formed at top cover 51, a terminal block 61 placed in PCU case 50 and arranged facing opening 53, and a substrate 70 placed in PCU case 50 and on which an electronic component 84 is mounted. Terminal block 61 includes a wall 62 as the first wall. Wall 62 is arranged between substrate 70 and opening 53, and extends towards top cover 51 at a circumference of the aperture of opening 53.

By power control unit 21 according to the first embodiment of the present invention configured as set forth above, an intrusion of a foreign object towards substrate 70 can be prevented by virtue of wall 62. Furthermore, by providing wall 62 at terminal block 61, a coating or attachment of a cover for the substrate, provision of a sealing member, and the like are dispensable. Thus, reduction in the size and cost of power control unit 21 can be realized.

(Second Embodiment)

In the present embodiment, a configuration of terminal block 61 in power control unit 21 of the first embodiment will be described further.

Figure 12:
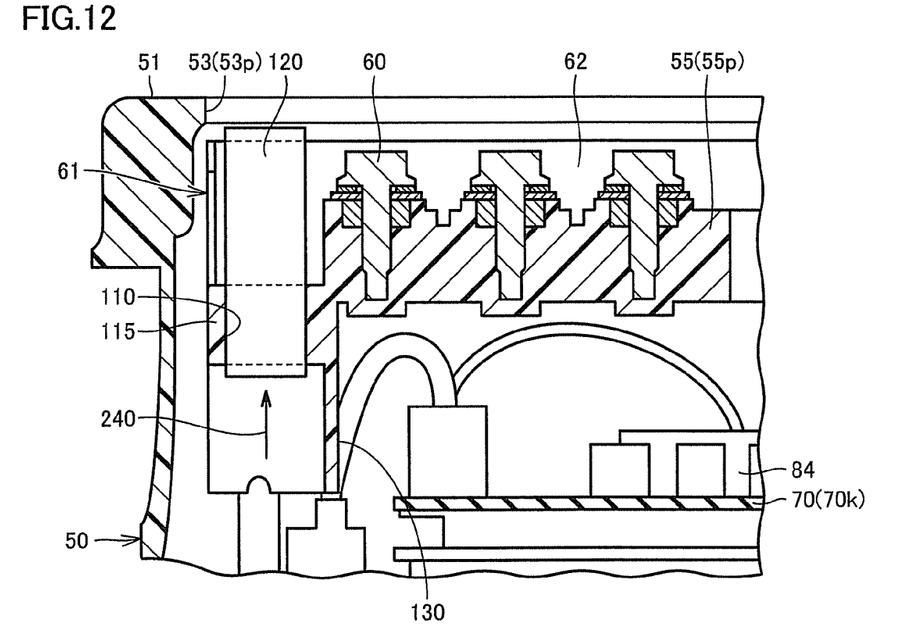
FIG. 12 is a sectional view of the power control unit taken along line XII-XII in FIG. 3.

FIG. 12 is a sectional view of a power control unit taken along line XII-XII in FIG. 3. Referring to FIGS. 3, 5 and 12, power control unit 21 includes an interlock connector 120. Interlock connector 120 is attached to terminal block 61. Another cover is further attached so as to cover top cover 51 with power control unit 21 mounted on the vehicle body. The attachment of the cover is confirmed by the insertion of the pin supported by the cover into interlock connector 120.

A connector retain hole 110 is formed at terminal block 61. Terminal block 61 includes a connector attachment boss 115. Connector attachment boss 115 is provided in a linked manner with joint 55p. Connector attachment boss 115 is located at an end of terminal block 61 in the direction indicated by arrow 210 in FIG. 4. Connector retain hole 110 is formed in connector attachment boss 115.

Connector retain hole 110 is located opposite to opening 53p. Connector retain hole 110 pierces connector attachment boss 115 in the vertical direction to reach the interior of PCU case 50. Interlock connector 120 is attached to connector attachment boss 115 by being inserted into connector retain hole 110 from the direction indicated by arrow 240 in FIG. 12.

Power control unit 21 includes a wall 130. In the present embodiment, wall 130 is formed integrally with terminal block 61. Wall 130 is resin-molded integrally with joint 55p.

Substrate 70 (substrate 70k) is arranged at a side opposite to top cover 51 relative to terminal block 61 in the height direction. In other words, top cover 51, terminal block 61 and substrate 70 are arranged aligned downwards from the top in the cited order. Wall 130 is arranged between connector retain hole 110 and substrate 70 (substrate 70k). Wall 130 is arranged to cross a straight line connecting connector retain hole 110 and substrate 70. Substrate 70 is arranged at the reverse side of wall 130 when viewed from connector retain hole 110. Wall 130 extends from connector attachment boss 115 downwards in the perpendicular direction. Wall 130 extends from connector attachment boss 115 in the direction of inserting interlock connector 120 into connector retain hole 110. By such a configuration, insertion of interlock connector 120 into connector retain hole 110 can be implemented readily without interference of interlock connector 120 and wall 130 during the insertion work.

Substrate 70 is arranged deviated from the site opposite to the aperture of connector retain hole 110 in connector attachment boss 115. Wall 130 extends from connector attachment boss 115 up to the proximity of substrate 70 in the height direction. Wall 130 may extend from connector attachment boss 115 to a position overlapping with substrate 70 in the height direction.

When viewed from the direction of inserting interlock connector 120 into connector retain hole 110, wall 130 is arranged at three of the four sides around connector attachment boss 115, excluding the side opposite to the side where substrate 70 is arranged relative to connector retain hole 110.

Wall 130 may be provided integrally with another power control unit component arranged adjacent to substrate 70, instead of integrally with terminal block 61.

During the transfer of power control unit 21 to the assembly plant of the hybrid vehicle or during assembly of power control unit 21 to the vehicle body, one concern is a foreign object entering PCU case 50 through opening 53p and connector retain hole 110 towards substrate 70. In view of the problem, wall 130 is provided at power control unit 21 of the present embodiment such that the path between connector retain hole 110 and substrate 70 is blocked. By such a configuration, the travel of a foreign object entering PCU case 50 through connector retain hole 110 towards substrate 70 can be prevented. Since wall 130 is provided integrally with terminal block 61, reduction in the cost and size of power control unit 21 can be achieved.

The configuration of a power control unit according to the second embodiment of the present invention is summarized in the following. Power control unit 21 of the present embodiment is mounted on a vehicle, and controls the power to be used for driving the vehicle. Power control unit 21 includes a PCU case 50 as the casing, having a top cover 51 as the top and an opening 53 formed at top cover 51, a terminal block 61 having a connector retain hole 110 formed to retain an interlock connector 120 that is a connector, and arranged opposite to opening 53 at PCU case 50, and a substrate 70 placed in PCU case 50 and on which an electronic component 84 is mounted. Substrate 70 is arranged at a side opposite to top cover 51 relative to terminal block 61, and deviated from the site opposite to the aperture of connector retain hole 110. Power control unit 21 further includes a wall 130 as a wall member provided integrally with terminal block 61 as a power control unit constituent component, and disposed between substrate 70 and connector retain hole 110.

By power control unit 21 according to the second embodiment of the present invention configured as set forth above, an intrusion of a foreign object towards substrate 70 can be prevented by the provision of wall 130. Furthermore, by providing wall 130 at terminal block 61, a coating or attachment of a cover for the substrate, provision of a sealing member, and the like are dispensable. Thus, reduction in the size and cost of power control unit 21 can be realized.

The present invention can also be applied to a power control unit incorporated in a fuel cell hybrid vehicle (FCHV) or an electric vehicle (EV) having a fuel cell and a secondary battery as the power source. The hybrid vehicle of the present embodiment drives the internal combustion engine at the optimum operating point of fuel whereas the fuel cell hybrid vehicle drives the fuel cell at the optimum operating point of power generation efficiency. The usage of the secondary battery is basically the same in either hybrid vehicle.

INDUSTRIAL APPLICABILITY

The present invention is applied mainly to a power control unit incorporated in a vehicle such as a hybrid vehicle or the electric vehicle for controlling the power used for driving the vehicle.

REFERENCE SIGNS LIST 10 voltage sensor; 11, 24, 25 current sensor; 12 boost converter; 14, 22 inverter; 15 U-phase arm; 16 V-phase arm; 17 W-phase arm; 20 vehicle driving device; 21 power control unit; 26 power split mechanism; 30 control device; 31 fuse; 32 reactor; 33, 34 smoothing capacitor; 35 A/C compressor; 40 battery unit; 41, 42 terminal; 43, 44 DC terminal; 46, 47, 56, 57, 58, 86 bus bar; 47U U-phase bus bar; 47V V-phase bus bar; 47W W-phase bus bar; 50 PCU case; 51 top cover; 52 case body; 53, 53p, 53q, 53r opening; 55, 55p, 55q, 55r joint; 60 bolt; 61 terminal block; 62, 89, 91 wall; 63 back section; 64, 65 side section; 66 U-phase joint; 67 V-phase joint; 68 W-phase joint; 70, 70j, 70k substrate; 82 rib-like section; 84 electronic component; 88 capacitor case; 96 first joint; 97 second joint; 98 third joint; 99 fourth joint; 110 connector retain hole; 115 connector attachment boss; 120 interlock connector; 130 wall; 310 first space; 320 second space.

The invention claimed is:

1. A power control unit mounted on a vehicle for controlling electric power used for driving the vehicle, comprising:
a casing including a top where an opening is formed,
a terminal block placed in said casing, and arranged opposite to said opening, and
a substrate placed in said casing, and on which an electronic component is mounted,
said terminal block having a first wall arranged between said substrate and said opening, and extending towards said top at a circumference of an aperture of said opening,
said casing further including a rib-like section arranged between said substrate and said opening, and protruding from an inner edge of said top defining said opening towards inside said casing,
said first wall being provided to block a line of sight from outside said casing towards said substrate, through said opening and over said rib-like section,
said opening being formed to allow communication between the outer side of said casing and a space within said casing in which said substrate is placed,
said first wall being provided not to be in contact with said casing.

2. The power control unit according to claim 1, further comprising:
a bus bar connected to said terminal block, and
a bolt fastening said bus bar to said terminal block,
wherein said opening is formed to allow access to said bolt from outside said casing through said opening.

3. The power control unit according to claim 1, further comprising a bus bar connected to said terminal block, wherein
said terminal block further includes a joint into which a bolt for fastening said bus bar is inserted, and
when viewed from a direction of inserting the bolt relative to said joint, said bus bar extends from said joint at a side opposite to said substrate with said joint therebetween, and said first wall is arranged between said joint and said substrate.

4. The power control unit according to claim 3, wherein, when viewed from a direction of inserting the bolt relative to said joint, said first wall is arranged at three of four sides around said joint, excluding a side corresponding to an extending direction of said bus bar.

5. A power control unit mounted on a vehicle for controlling electric power used for driving the vehicle, comprising:
a casing including a top where an opening is formed,
a terminal block placed in said casing, and arranged opposite to said opening, and
a substrate placed in said casing, and on which an electronic component is mounted,
said terminal block having a first wall arranged between said substrate and said opening, and extending towards said top at a circumference of an aperture of said opening,
said casing further including a rib-like section arranged between said substrate and said opening, and protruding from an inner edge of said top defining said opening towards inside said casing,
said first wall extending up to a position overlapping with said rib-like section in a height direction,
said opening being formed to allow communication between the outer side of said casing and a space within said casing in which said substrate is placed,
said opening penetrating said top in one direction from the outer side of said casing into a space within said casing in which said substrate is placed,
in viewing said opening in said one direction, said first wall being located hidden at the back side of said top.

6. A power control unit mounted on a vehicle for controlling electric power used for driving the vehicle, comprising:
a casing including a top where an opening is formed,
a terminal block placed in said casing, and arranged opposite to said opening, and
a substrate placed in said casing, and on which an electronic component is mounted, said terminal block having a first wall arranged between said substrate and said opening, and extending towards said top at a circumference of an aperture of said opening, said substrate being arranged at a side opposite to said top relative to said terminal block, said terminal block further including a second wall extending in a direction opposite to said first wall, and in the direction where said substrate is not present, said opening being formed to allow communication between the outer side of said casing and a space within said casing in which said substrate is placed, said first wall and said second wall being provided not to be in contact with said casing.

7. A power control unit mounted on a vehicle for controlling electric power used for driving the vehicle, comprising:

a casing including a top where an opening is formed, a terminal block placed in said casing, and arranged opposite to said opening, a substrate placed in said casing, and on which an electronic component is mounted, said terminal block having a first wall arranged between said substrate and said opening, and extending towards said top at a circumference of an aperture of said opening, a bus bar connected to said terminal block, and a power control unit constituent component placed in said casing, and having said bus bar connected, wherein said power control unit constituent component includes a third wall arranged between said substrate and said opening, and extending towards said top at a circumference of an aperture of said opening, between said top and said bus bar.

* * * * *